(12) United States Patent
Takata

(10) Patent No.: US 10,790,517 B2
(45) Date of Patent: Sep. 29, 2020

(54) SEPARATOR FOR FUEL BATTERIES AND FUEL BATTERY

(71) Applicant: TOYOTA JIDOSHA KABUSHIKI KAISHA, Toyota-shi, Aichi (JP)

(72) Inventor: Satoshi Takata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/166,270

(22) Filed: Oct. 22, 2018

(65) Prior Publication Data
US 2019/0198890 A1 Jun. 27, 2019

(30) Foreign Application Priority Data
Dec. 22, 2017 (JP) ................................. 2017-246031

(51) Int. Cl.
| | |
|---|---|
| H01M 8/0228 | (2016.01) |
| H01M 8/0206 | (2016.01) |
| H01M 8/0215 | (2016.01) |
| H01M 8/1039 | (2016.01) |
| H01M 8/1018 | (2016.01) |

(52) U.S. Cl.
CPC ....... *H01M 8/0228* (2013.01); *H01M 8/0206* (2013.01); *H01M 8/0215* (2013.01); *H01M 8/1039* (2013.01); *H01M 2008/1095* (2013.01); *H01M 2300/0082* (2013.01)

(58) Field of Classification Search
CPC ............. H01M 8/0206; H01M 8/0215; H01M 8/0228; H01M 8/1039; H01M 2008/1095; H01M 2300/0082
See application file for complete search history.

(56) References Cited

U.S. PATENT DOCUMENTS

2007/0003813 A1* 1/2007 Vyas ................... H01M 8/0204
429/450

FOREIGN PATENT DOCUMENTS

| JP | 08-180884 A | 7/1996 |
| JP | 08-185870 A | 7/1996 |
| JP | 2011-008934 A | 1/2011 |

* cited by examiner

*Primary Examiner* — Tracy M Dove
(74) *Attorney, Agent, or Firm* — Dickinson Wright PLLC

(57) ABSTRACT

A means for imparting low contact resistance and excellent corrosion resistance under highly corrosive environments, such as environments in the presence of a fluoride ion, to a separator for fuel batteries includes a separator for fuel batteries including a metal base material and a tin oxide film formed on a surface of the metal base material, in which the tin oxide film is tin oxide containing zirconium, and an element ratio of zirconium to tin (Zr/Sn) is in a range of 0.10 to 0.70.

4 Claims, 3 Drawing Sheets

SEPARATOR FOR FUEL BATTERIES AND FUEL BATTERY

CROSS REFERENCE TO RELATED APPLICATIONS

The present application claims priority from Japanese patent application JP 2017-246031 filed on Dec. 22, 2017, the content of which is hereby incorporated by reference into this application.

BACKGROUND

Technical Field

The present disclosure relates to a separator for fuel batteries and a fuel battery using the same.

Background Art

A fuel battery cell of a polymer electrolyte fuel battery is provided with a membrane electrode assembly (MEA) comprising: an ion permeable electrolyte membrane; and an anode side catalyst layer (electrode layer) and a cathode side catalyst layer (electrode layer) holding the electrolyte membrane therebetween. A gas diffusion layer (GDL) for providing a fuel gas or an oxidant gas and for collecting electricity generated through an electrochemical reaction is formed on both sides of the membrane electrode assembly. The membrane electrode assembly with the GDL disposed on the both sides is called MEGA (Membrane Electrode & Gas Diffusion Layer Assembly), and the MEGA is held between a pair of separators. The MEGA is a power generation section of a fuel battery. When the gas diffusion layer does not exist, the membrane electrode assembly functions as a power generation section of a fuel battery.

For example, as a separator for fuel batteries, JP 8-185870 A proposes a separator described below. This separator comprises: a base substrate that is constituted by a cermet comprising a chromium-containing heat-resistant metal and a ceramic; and a protective film of a metal oxide that covers a face of the base substrate, the face to be exposed to a cathode gas, so that the face is not brought into contact with the cathode gas. Further, JP 8-185870 A discloses tin oxide as one example of this metal oxide.

SUMMARY

According to the separator for fuel batteries of JP 8-185870 A, lowering of the electric power generation performance of a fuel battery can be suppressed by reducing the diffusion of chromium to the cathode by means of the protective film of a metal oxide. In addition, tin oxide has relatively high electrical conductivity and therefore can reduce contact resistance. However, when tin oxide is used as the protective film of a metal oxide, tin oxide allows a fluoride ion to permeate, and therefore the fluoride ion that has permeated through the tin oxide film forms a complex with a metal in the base substrate, such as Fe, and the metal in the base substrate is dissolved therefrom. When the metal such as Fe is dissolved, a metal ion such as an Fe ion serves as a catalyst to produce hydrogen peroxide (Fenton reaction), and there is a possibility that a solid electrolyte membrane decomposes. If the solid electrolyte membrane decomposes, the electric power generation performance of a fuel battery is naturally lowered.

In addition, in a fuel battery, a fluoride ion is produced from, for example, a solid electrolyte membrane that contains a fluorine-based electrolyte resin, such as a perfluorosulfonic acid based polymer, or the like. Therefore, for example, when Fe is dissolved from a base substrate due to the fluoride ion, an Fe ion serves as a catalyst to produce hydrogen peroxide, and due to this hydrogen peroxide, the solid electrolyte membrane of a fluorine-based electrolyte resin further decomposes. When the solid electrolyte membrane of a fluorine-based electrolyte resin decomposes, a fluoride ion is further produced, and therefore there is a problem that corrosion further progresses.

Thus, the present disclosure provides a separator for fuel batteries, having low contact resistance and having excellent corrosion resistance in highly corrosive environments, such as environments in the presence of a fluoride ion.

Illustrative aspects of the present embodiment are as follows.

(1) A separator for fuel batteries, comprising:
a metal base material; and
a tin oxide film formed on a surface of the metal base material,
wherein the tin oxide film is tin oxide comprising zirconium, and
an element ratio of zirconium to tin (Zr/Sn) is in a range of 0.10 to 0.70.

(2) The separator for fuel batteries according to (1), wherein a content of the zirconium in the tin oxide film is 3.0 atom % or more and 16.0 atom % or less.

(3) A fuel battery comprising the separator for fuel batteries according to (1) or (2).

(4) The fuel battery according to (3), further comprising a solid electrolyte membrane.

(5) The fuel battery according to (4), wherein the solid electrolyte membrane comprises a fluorine-based electrolyte resin.

The present disclosure can provide a separator for fuel batteries having low contact resistance and having excellent corrosion resistance in highly corrosive environments, such as environments in the presence of a fluoride ion.

DETAILED DESCRIPTION

The present embodiment includes a separator for fuel batteries, comprising: a metal base material; and a tin oxide film formed on a surface of the metal base material, wherein the tin oxide film is tin oxide comprising zirconium, and an element ratio of zirconium to tin (Zr/Sn) is in a range of 0.10 to 0.70. In addition, the present embodiment includes a fuel battery comprising the separator for fuel batteries according to the present embodiment.

Hereinafter, the present embodiment will be described with reference to the accompanying drawings. Hereinafter, as one example, a case where the separator for fuel batteries according to the present embodiment is applied to a fuel battery to be installed on fuel battery vehicles and the like will be described. However, the present disclosure is not limited to such an example.

Figure 1:
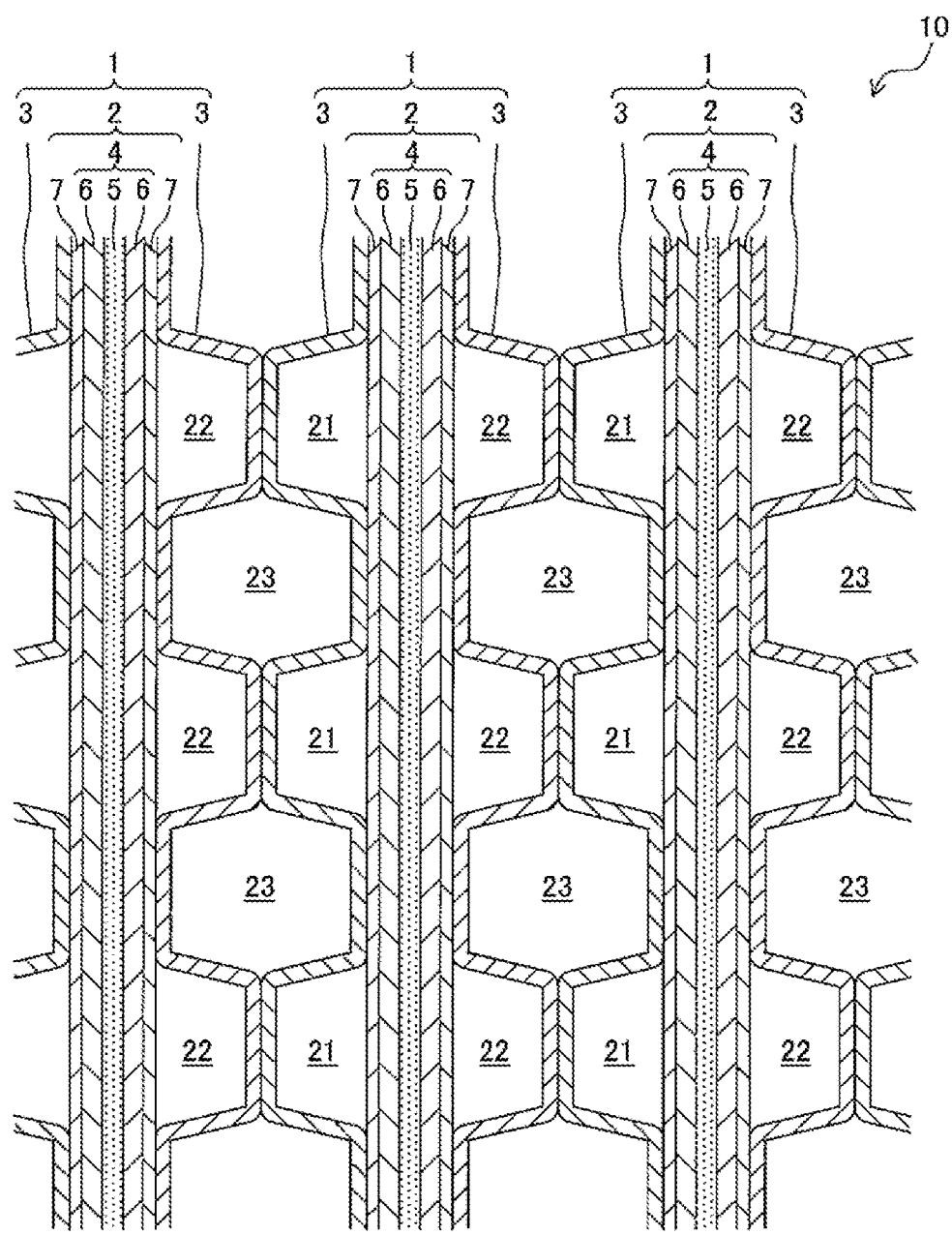
FIG. 1 is a section view of the main part of the fuel battery stack provided with the separator for fuel batteries according to the present embodiment.

FIG. 1 is a diagram of a section view of the main part of a fuel battery stack (fuel battery) 10. As illustrated in FIG. 1, in the fuel battery stack 10, a plurality of cells (single cells) 1 each being a basic unit is stacked. Each cell 1 is a polymer electrolyte fuel battery that generates electromotive force through an electrochemical reaction between an oxidant gas (for example, air) and a fuel gas (for example, hydrogen). The cell 1 is provided with: an MEGA 2; and separators (separators for fuel batteries) 3 which are each in contact with the MEGA 2 such that the cell 1 divides the MEGA 2. Incidentally, in the present embodiment, the MEGA 2 is held between a pair of separators 3, 3.

The MEGA 2 is obtained by integrating a membrane electrode assembly (MEA) 4 and a gas diffusion layer 7, 7 disposed on both surfaces of the membrane electrode assembly 4. The membrane electrode assembly 4 includes an electrolyte membrane 5 and a pair of electrodes 6, 6 joined so as to hold the electrolyte membrane 5 therebetween. The electrolyte membrane 5 comprises a proton-conductive ion change membrane formed with a solid polymer material. The electrode 6 is formed with, for example, a porous carbon material on which a catalyst such as platinum is carried. The electrode 6 disposed on one side of the electrolyte membrane 5 is an anode, and the electrode 6 on the other side is a cathode. The gas diffusion layer 7 is formed with, for example, an electrically conductive member having gas permeability, the electrically conductive member including a carbon porous body such as carbon paper or carbon cloth, or metal porous body such as a metal mesh or a foam metal.

The MEGA 2 is a power generation section of the fuel battery 10, and the separator 3 is in contact with the gas diffusion layer 7 of the MEGA 2. In addition, when the gas diffusion layer 7 does not exist, the membrane electrode assembly 4 is a power generation section, and in this case, the separator 3 is in contact with the membrane electrode assembly 4. Accordingly, the power generation section of the fuel battery 10 includes the membrane electrode assembly 4 and is contact with the separator 3.

The separator 3 is a plate-shaped member comprising, as a base material, a metal excellent in electrical conductivity, gas impermeability, and the like. One surface of the separator 3 abuts on the gas diffusion layer 7 of the MEGA 2, and the other surface abuts on adjacent another separator 3.

Each separator 3 is formed into a wave shape. With respect to the shape of the separator 3, the shape of the wave forms an isosceles trapezoid, the apex portion of the wave is flat, and both ends of the apex portion have an equal angle to be angular. That is, the shape of each separator 3 is almost the same irrespective of whether viewed from a surface side or a back side. The apex portion of the separator 3 is in surface contact with one of the gas diffusion layer 7 of the MEGA 2, and the apex portion of the other separator 3 is in surface contact with the other gas diffusion layer 7 of the MEGA 2.

A gas flow passage 21 defined between the gas diffusion layer 7 and the separator 3 on one electrode (namely, anode) 6 side is a passage in which the fuel gas is circulated, and a gas flow passage 22 defined between the gas diffusion layer 7 and the separator 3 on the other electrode (namely, cathode) 6 side is a passage in which the oxidant gas is circulated. When the fuel gas is supplied in the gas flow passage 21, which is one of the gas flow passages facing each other through the cell 1, and the oxidant gas is supplied in the gas flow passage 22, the electrochemical reaction occurs in the cell 1 to generate electromotive force.

Further, some cell 1 and another cell 1 adjacent thereto are disposed so that the electrode 6 as an anode and the electrode 6 as a cathode face each other. In addition, an apex portion on the back surface side of the separator 3 disposed along the electrode 6 as an anode of some cell 1 and an apex portion on the back surface side of the separator 3 disposed along the electrode 6 as a cathode of another cell 1 are in surface contact with each other. In a space 23 defined between the separators 3, 3 which are in surface contact with each other between two adjacent cells 1, water as a cooling medium for cooling the cell 1 is circulated.

Figure 2:
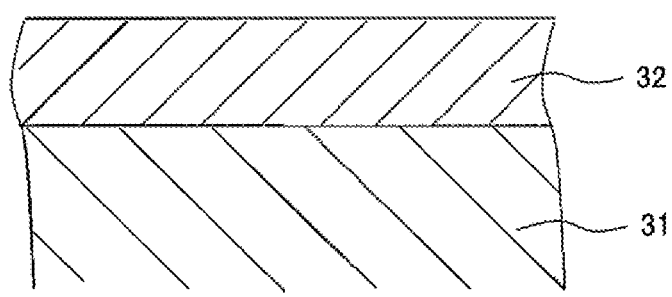
FIG. 2 is an enlarged section view near the surface of the separator for fuel batteries according to the present embodiment.

As illustrated in FIG. 2, the separator 3 comprises a metal base material 31. Examples of the material for the metal base material include titanium or stainless steel. Further, both surfaces of the separator 3 (namely, the surface on the side being in contact with the gas diffusion layer 7 and the surface on the side being in contact with the adjacent separator 3) are covered by a tin oxide film 32.

The film thickness of the tin oxide film is in a range of 10 to 300 nm in some embodiments. When the film thickness of the tin oxide film is 10 nm or more, an effect brought about by the tin oxide film can be sufficiently exhibited. In addition, when the film thickness of the tin oxide film is 300 nm or less, the internal stress of the tin oxide film can be suppressed, and therefore peeling of the tin oxide film from the metal base material can be suppressed.

In the present embodiment, the tin oxide film may be provided on at least a portion of the surface of the metal base material, but the corrosion resistance is particularly required in a portion where the gas diffusion layer and the separator are in contact with each other. Therefore, in some embodiments, the tin oxide film is formed on at least a portion which is in contact with the gas diffusion layer, in the surface of the metal base material.

The tin oxide film is tin oxide comprising zirconium. Zirconium has a characteristic of adsorbing a fluoride ion, and therefore the permeation of the fluoride ion through the tin oxide film can be suppressed by allowing the tin oxide film to contain zirconium therein. In addition, the element ratio of zirconium to tin (Zr/Sn) in the tin oxide film is in a range of 0.10 or more and 0.70 or less. When the element ratio (Zr/Sn) is less than 0.10, dissolution of a metal (such as Fe) from the metal base material becomes large, and therefore sufficient corrosion resistance cannot be obtained. In addition, when the element ratio (Zr/Sn) exceeds 0.70, the contact resistance becomes large, and therefore the electric power generation performance of the fuel battery is lowered. It is inferred that this is because an electrically conductive network structure of high-electrical-conductive tin oxide is broken by zirconium when the element ratio (Zr/Sn) becomes high. In some embodiments, the element ratio (Zr/Sn) is 0.20 or more, 0.30 or more, or 0.40 or more from the viewpoint of corrosion resistance. In some embodiments, the element ratio (Zr/Sn) is 0.60 or less, or 0.50 or less from the viewpoint of contact resistance.

In some embodiments, the content of zirconium in the tin oxide film is 3.0 atom % or more and 16.0 atom % or less, 8.0 atom % or more and 14.0 atom % or less, or 10.0 atom % or more and 12.0 atom % or less.

The tin oxide film may comprise antimony (Sb) in addition to tin and zirconium. When the tin oxide film comprises antimony, 5-valent antimony is substituted for a 4-valent tin site in the crystalline lattice of tin oxide. Therefore, the concentration of carrier inside the tin oxide film becomes high, so that the electrical conductivity (specific electrical conductivity) of the tin oxide film is improved. Thereby, the contact resistance of the separator on which the tin oxide film is formed can be reduced, and the internal resistance of the fuel battery stack can be reduced. In some embodiments, the content of antimony in the tin oxide film is 0.2 atom % or more and 10.0 atom % or less, 0.3 atom % or more and 5.0 atom % or less, or 0.4 atom % or more and 4.0 atom % or less.

The tin oxide film may comprise an additional metal other than the above-described tin, zirconium, and antimony. Examples of the additional metal include bismuth and tellurium. In some embodiments, the content of the additional metal in the tin oxide film is 1.0 atom % or less, 0.5 atom % or less, or 0.1 atom % or less.

Incidentally, the concentrations of the metal elements in the metal base material can be measured by conducting composition analysis using, for example, an apparatus for X-ray photoelectron spectroscopy (XPS).

The method for forming a tin oxide film on a metal base material is not particularly limited. For example, the film can be formed by a physical vapor deposition method (PVD) utilizing sputtering, vacuum vapor deposition, ionized vapor deposition, ion plating, or the like. For example, the tin oxide film can be formed on the surface of a metal base material through sputtering utilizing plasma or the like, using as a target a calcined body obtained by calcining a mixture of tin oxide particles and zirconium oxide particles. In this case, by adjusting the amounts of tin oxide and zirconium oxide, a tin oxide film having a desired element ratio (Zr/Sn) can be obtained.

Incidentally, when the tin oxide film is formed through sputtering, the sputtering can be performed in an oxygen gas atmosphere, in an inert gas atmosphere, or in a vacuum atmosphere (in a reduced pressure atmosphere) in forming the tin oxide film. In some embodiments, the tin oxide film is formed in an inert gas atmosphere or in a vacuum atmosphere (in a reduced pressure atmosphere).

As described above, the separator for fuel batteries according to the present embodiment has low contact resistance attributable to tin oxide having high electrical conductivity, and in addition, has excellent corrosion resistance in highly corrosive environments, such as environments in the presence of a fluoride ion, because zirconium suppresses the passage of the fluoride ion.

In a fuel battery, a fluoride ion is easily produced from a fluorine-based electrolyte resin such as a perfluorosulfonic acid based polymer, as described above. Therefore, when a fuel battery uses a solid electrolyte membrane comprising a fluorine-based electrolyte resin, the separator for fuel batteries according to the present embodiment becomes particularly useful. Examples of the fluorine-based electrolyte resin include perfluorosulfonic acid based polymers, and specific examples include Nafion (trade name, manufactured by E. I. du Pont de Nermours and Company), Flemion (trade name, manufactured by AGC Inc.), and Aciplex (trade name, manufactured by Asahi Kasei Corp.). Among these, Nafion (trade name, manufactured by E. I. du Pont de Nermours and Company) can be suitably used because it is excellent in proton conductivity.

EXAMPLES

The present embodiment is described below with reference to the Examples.

Example 1

A test piece corresponding to a separator was prepared according to the method described below. Firstly, an SUS316 plate having a thickness of 0.1 mm was prepared as a metal base material for a separator. Next, the metal base material was placed in a vacuum container, an argon gas was then introduced into the vacuum container under a vacuum condition and voltage was applied to produce an argon ion, and an oxide film on the surface of the metal base material was removed by the argon ion.

Next, a calcined body obtained by calcining a mixture of 89.1 parts by mass of tin oxide particles, 8.2 parts by mass of zirconium oxide particles, and 2.7 parts by mass of antimony oxide particles was disposed as a target in the vacuum container. Sputtering was performed using this calcined body as a target to form a tin oxide film on the surface of the metal base material. Specifically, the metal base material was first disposed at a position facing the target, and the vacuum container was evacuated to make the inside thereof in a vacuum atmosphere (in a reduced pressure atmosphere). Next, an argon gas was introduced as a sputtering gas into the vacuum container, and the target material was deposited on the metal base material by applying voltage in a state where the metal base material was heated and allowing an argon ion to collide with the target. Incidentally, bias voltage was applied between the target and the metal base material. Thus, a tin oxide film having a thickness of 100 nm was formed on the surface of the metal base material. Thereby, a test piece E1 was prepared.

Example 2

A test piece E2 was prepared in the same manner of Example 1, except that a calcined body obtained by calcining a mixture of 80.8 parts by mass of the tin oxide particles, 16.8 parts by mass of the zirconium oxide particles, and 2.4 parts by mass of the antimony oxide particles was used as the target.

Example 3

A test piece E3 was prepared in the same manner of Example 1, except that a calcined body obtained by calcining a mixture of 72.2 parts by mass of the tin oxide particles, 25.7 parts by mass of the zirconium oxide particles, and 2.2 parts by mass of the antimony oxide particles was used as the target.

Example 4

A test piece E4 was prepared in the same manner of Example 1, except that a calcined body obtained by calcining a mixture of 63.2 parts by mass of the tin oxide particles, 34.9 parts by mass of the zirconium oxide particles, and 1.9 parts by mass of the antimony oxide particles was used as the target.

Comparative Example 1

A test piece C1 was prepared in the same manner of Example 1, except that a calcined body obtained by calcining a mixture of 96.8 parts by mass of the tin oxide particles and 3.2 parts by mass of the antimony oxide particles (zirconium oxide particles were not contained) was used as the target.

Comparative Example 2

A test piece C2 was prepared in the same manner of Example 1, except that a calcined body obtained by calcining a mixture of 54.1 parts by mass of the tin oxide particles, 44.3 parts by mass of the zirconium oxide particles, and 1.6 parts by mass of the antimony oxide particles was used as the target.

<Measurement of Element Ratio (Zr/Sn)>

The content of tin (Sn) and of zirconium (Zr) were each measured using an X-ray spectroscopic apparatus (QuanteraSXM manufactured by PHI) to calculate the element ratio of zirconium to tin (Zr/Sn) for the tin oxide films of the test pieces E1 to E4 and C1 to C2 prepared in Examples 1 to 4 and Comparative Examples 1 to 2. The results are shown in Table 1.

Incidentally, the contents of antimony (Sb) contained in the tin oxide films were respectively measured using an X-ray spectroscopic apparatus and found to be 3.0 atom % for all the test pieces.

<Corrosion Resistance Test>

A corrosion resistance test (constant potential corrosion test) in accordance with Method for high-temperature electrochemical corrosion test of metallic materials in molten salts (JIS Z2294) of Japanese Industrial Standards was conducted for the test pieces E1 to E4 and C1 to C2 prepared in Examples 1 to 4 and Comparative Examples 1 to 2. In an atmospherically open apparatus, each test piece was immersed in a sulfuric acid aqueous solution, the temperature of which was adjusted to 80° C. Incidentally, NaF was dissolved so that the concentration of a fluoride ion was 3000 ppm in the sulfuric acid aqueous solution. In this state, the test piece was corroded by electrically connecting a counter electrode consisting of a platinum plate and the test piece (sample electrode) and thereby generating a potential difference of 0.9 V between the counter electrode and the sample electrode. The potential of the test piece was held constant with a reference electrode. The test time was set to 100 hours. Thereafter, the amount of Fe dissolved in the sulfuric acid aqueous solution was measured by an ICP atomic emission spectroscopy (inductively coupled plasma atomic emission spectroscopy). The results are shown in Table 1.

<Contact Resistance Test>

The contact resistance was measured for each test piece after the corrosion resistance test by the following method. Carbon paper (Toray Industries, Inc., TGP-H120, thickness of 0.5 mm) corresponding to a diffusion layer of a power generation section of a fuel battery was put on the surface of the tin oxide film of each test piece, and a gold-plated copper plate was put on top of that to hold the carbon paper between the test piece and the copper plate. Incidentally, to measure only the contact resistance between the tin oxide film and the carbon paper, the other surface of the test piece (the surface on which a film is not formed) was also brought into contact with a gold-plated copper plate so that the contact resistance was not generated between these members. Next, with a measurement jig, a pressure of constant load (0.98 MPa) was applied on the surface of the test piece. In this state, a current from a power source was made to flow while the current was adjusted by an ammeter so that a current that flows in the test piece is constant. The voltage applied to the test piece was measured by a voltmeter to calculate the contact resistance between the tin oxide film on the test piece and the carbon paper. The results are shown in Table 1.

TABLE 1

| | Amount of Zr (atom %) | Amount of Sn (atom %) | Element ratio (Zr/Sn) | Amount of Fe dissolved (ng/ml) | Contact resistance (mΩ · cm$^2$) |
|---|---|---|---|---|---|
| Comparative Example 1 | 0 | 30.2 | 0 | 210 | 11 |
| Example 1 | 3.5 | 31.0 | 0.11 | 95 | 11 |
| Example 2 | 7.2 | 28.5 | 0.25 | 23 | 11 |
| Example 3 | 11.2 | 25.8 | 0.43 | 9 | 11 |
| Example 4 | 15.5 | 23.0 | 0.68 | <5 | 12 |
| Comparative Example 2 | 20.0 | 20.0 | 1.00 | <5 | 23 |

<Consideration>

Figure 3:
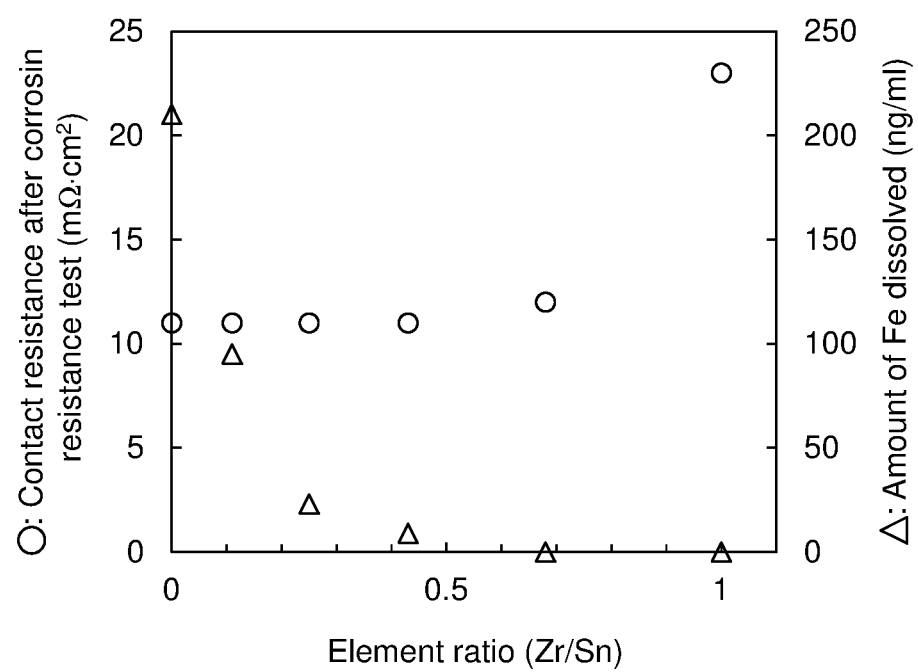
FIG. 3 is a graph showing the relationship between the element ratio (Zr/Sn) (abscissa) and the contact resistance or the amount of Fe dissolved (ordinate) with respect to the results of the Examples and the Comparative Examples.

FIG. 3 illustrates a graph showing the relationship between the element ratio (Zr/Sn) (abscissa) and the contact resistance or the amount of Fe dissolved (ordinate). As shown in FIG. 3, when the element ratio (Zr/Sn) is small, namely when the amount of zirconium is small, the amount of Fe dissolved becomes large. It is considered that this is because the amount of zirconium in the tin oxide film was smaller than that required for preventing Fe in the metal base material from forming a complex due to the fluoride ion. In addition, when the element ratio (Zr/Sn) is large, namely when the amount of zirconium is large, the contact resistance becomes high. It is inferred that this is because the electrically conductive network of high-electrical-conductive tin oxide required for the exhibition of high electrical conductivity is broken by zirconium. From those described above, it can be seen that a separator for fuel batteries, having low contact resistance and having corrosion resistance, can be obtained when the element ratio (Zr/Sn) is 0.10 to 0.70.

The present embodiment is described above in detail, but the specific constitution is not limited to these present embodiment, and even when design changes within a range not deviating from the scope of the present embodiment are made, these are included in the present embodiment.

DESCRIPTION OF SYMBOLS

1 Cell
2 MEGA (power generation section)
3 Separator (separator for fuel batteries)
4 Membrane electrode assembly (MEA)
6 Electrode
7 Gas diffusion layer
10 Fuel battery stack (fuel battery)
21, 22 Gas flow passage
31 Metal base material
32 Tin oxide film

What is claimed is:

1. A separator for fuel batteries, comprising:
a metal base material; and
a tin oxide film formed on a surface of the metal base material,
wherein the tin oxide film is tin oxide comprising zirconium and antimony (Sb),
an element ratio of zirconium to tin (Zr/Sn) is in a range of 0.40 or more and 0.70 or less; and
a content of the zirconium in the tin oxide film is 11.2 atom % or more and 16.0 atom % or less.

2. A fuel battery comprising the separator for fuel batteries according to claim 1.

3. The fuel battery according to claim 2, further comprising a solid electrolyte membrane.

4. The fuel battery according to claim 3,
wherein the solid electrolyte membrane comprises a fluorine-based electrolyte resin.

\* \* \* \* \*